(No Model.)  2 Sheets—Sheet 1.

M. GANDY.
APPARATUS FOR MAKING LAMINATED BELTS.

No. 358,808.  Patented Mar. 1, 1887.

Witnesses.
Sam'l R. Taylor
Robert Bartlett

Inventor.
Maurice Gandy
by Bradford Prill
Attys.

(No Model.) 2 Sheets—Sheet 2.

M. GANDY.
APPARATUS FOR MAKING LAMINATED BELTS.

No. 358,808. Patented Mar. 1, 1887.

Witnesses.
Saml R. Taylor
Robert B. Bartlett

Inventor.
Maurice Gandy

UNITED STATES PATENT OFFICE.

MAURICE GANDY, OF NEW BRIGHTON, COUNTY OF CHESTER, ENGLAND.

APPARATUS FOR MAKING LAMINATED BELTS.

SPECIFICATION forming part of Letters Patent No. 358,808, dated March 1, 1887.

Application filed July 30, 1886. Serial No. 209,603. (No model.)

*To all whom it may concern:*

Be it known that I, MAURICE GANDY, a subject of the Queen of Great Britain, residing at New Brighton, in the county of Chester, England, have invented certain new and useful Improvements in Apparatus for and Methods of Making Laminated Belts, of which the following is a description in such full, clear, concise, and exact terms as will enable any one skilled in the art to which my invention relates to make and use the same, reference being had to the accompanying drawings, making part of this specification, and to the letters and figures of reference marked thereon.
Similar letters indicate corresponding parts in all the figures.

Figure 1:
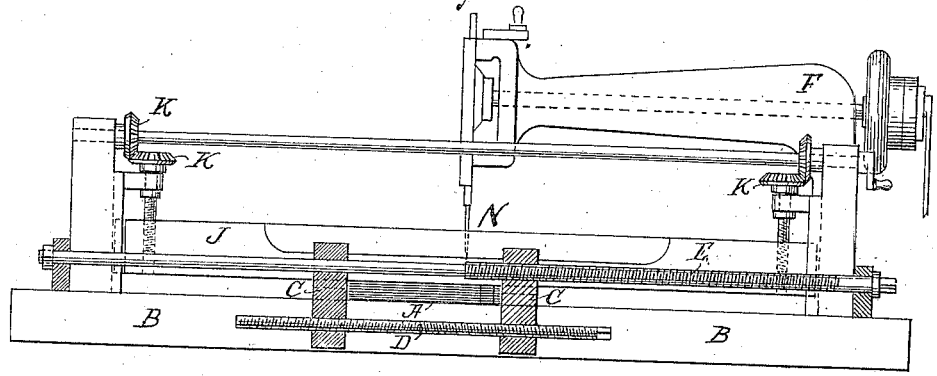
Figure 2:
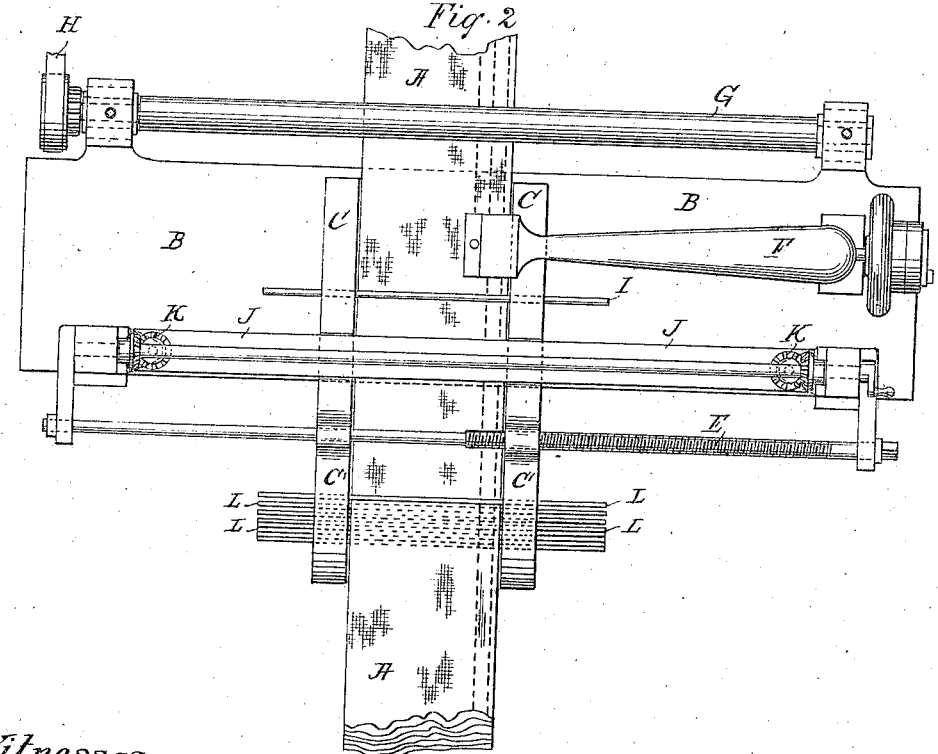
Figure 3:
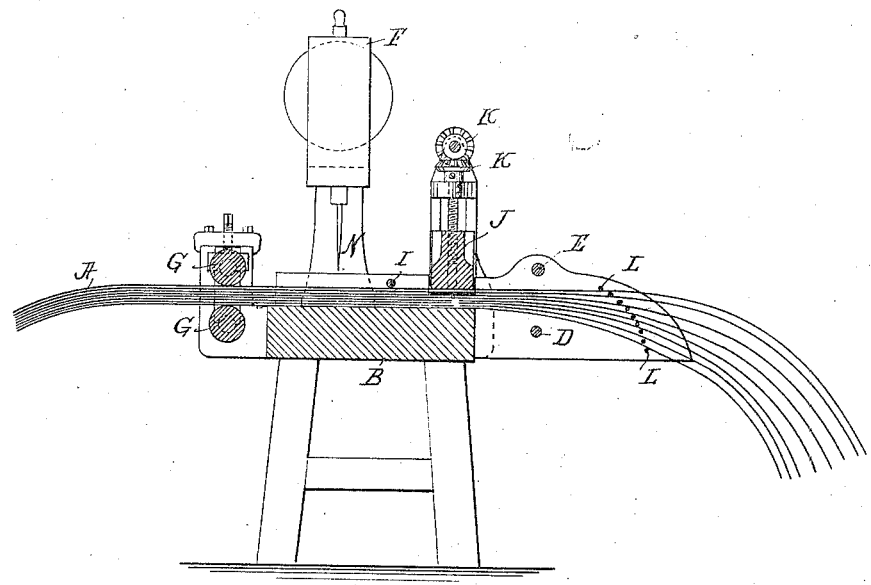

In said drawings, Figure 1 illustrates a front elevation, partly in section, Fig. 2 a top view, and Fig. 3 a side sectional view, of my improved apparatus.

Referring to said drawings, A is a belt, consisting of several distinct plies or laminæ, each width and ply being distinct and separate from all the rest, substantially such a belt as I have described and illustrated in Letters Patent granted to me November 9, 1886, No. 352,460, to which reference is here made for a fuller description of the same, this present specification being confined to a description of the apparatus and method employed in manufacturing said belt, or other belts made in substantially the same manner.

B is a table, upon which a pair of guides, C, are set. The distance between these guides may be varied to suit different widths of canvas by means of the double-threaded screw D'. A shaft, E, threaded only a part of its length, connects with one of said guides, by means of which the position of said guides may be shifted from side to side, in order to bring the proper portion of the belt under the needle N of the sewing-machine F.

Instead of the rod E being screw-threaded only a portion of its length, I may employ a rod screw-threaded throughout its entire length by making the hole through which it passes in one of said guides so large that it does not engage with said screw-thread.

Behind the sewing-machine a pair of friction or gripping rollers, G, are placed, said rollers being connected through the belt H with a suitable source of power for operating the same. By means of these rollers the belt is fed through the guides and under the machine-needle. The rod I, placed in front of the machine-needle, serves to keep the laminæ hard upon each other and down against the table when they are operated upon by the needle.

J J are a pair of nippers, placed in front of the needle to press the belt down against the table, and, in connection with the feeding-rollers G G, subject the belt to tension as it passes under the needle. These nippers are raised and lowered by means of the screws K K, preferably geared together to act in unison, as shown in Fig. 1.

At the forward end of the guide-box C' C' is a system of parallel rods, L L. The number of these rods corresponds with the number of plies of material which are employed to make up the necessary thickness of the belt. They are placed a sufficient distance apart to permit a single thickness of the material to pass between them. The office of these rods is twofold. In the first place, they prevent friction between the several plies, which would interfere with the action of the guides in bringing each ply home to its proper position with relation to the other plies, and, in the second place, they prevent the crimping or wrinkling of the several plies and remove such crimps or wrinkles, if any be present. By the devices I have described each ply is separately adjusted by the guides, so that they lie exactly on top of each other and make a belt in which the edges lie in the same horizontal plane, are smooth and even, and capable of running smoothly through and resisting the wear of guide-forks.

In the Letters Patent above referred to I have described a belt made of a plurality of plies of cotton, canvas, or duck, each ply woven to the exact width it is desired to make the belt, each width and ply being separate and distinct from all the rest and having a selvage on each edge thereof. These several plies, piled one on the other flatwise, are stitched together longitudinally by rows of stitching throughout the entire width of the belt and close along each edge, by which means the hard selvage edges of the several plies are drawn hard upon each other, thus making the two edges of the belt to consist of the combination of separate and distinct hard selvage edges united by rows of stitching. In order to make such a belt it is absolutely necessary that the separate plies be laid one exactly on top of the other, with all the selvages on the same horizontal plane, and that they be so held while being stitched; otherwise their edges will not be even, and the sewing-machine cannot catch and draw the selvages all together and hard upon each other by rows of stitching along the extreme edges. To accomplish this result is the principal object of my present invention. The guides which I have described not only bring the plies into the proper position with relation to each other, but they hold them there while the belt is being stitched.

In stitching the belt, if only one machine be used, I prefer to stitch a seam down the middle of the belt and then add parallel rows of stitching—say about three-eighths of an inch apart—commencing from the middle seam and running out toward each edge. If two machines be used, I prefer to put the first seams along the two extreme edges of the belt and afterward add the intervening seams.

I have described the best way of making my belt, and I understand that any merely formal change in the method and materials used and in the apparatus and devices employed will be covered by this description.

I therefore claim and desire to secure by Letters Patent—

1. In a machine for manufacturing laminated belting consisting of separate and distinct laminæ, a sewing-machine, in combination with feeding mechanism, and a guide having sides adapted to be set apart a distance equal to the width of the belt, for the purpose of adjusting the edges of the several laminæ exactly upon the same vertical plane and holding them there while being stitched, all arranged to operate substantially as described.

2. In a machine for manufacturing laminated belts composed of separate plies, a sewing-machine, combined with feeding mechanism, and a guide-box having parallel sides, and means, substantially as described, for adjusting the distance between said sides.

3. In a machine for manufacturing laminated belts composed of separate plies, the combination of feeding mechanism and guides, and means, substantially as described, for holding the several plies apart as they approach said guides.

4. In the manufacture of laminated belts composed of separate plies, the combination of feeding mechanism and guides, and a plurality of parallel rods set in a frame in front of said guides, for holding the several plies apart and removing the wrinkles therefrom as they approach said guides, substantially as described.

5. In the manufacture of laminated belts composed of separate plies, the combination of a sewing-machine, feeding-rollers, guides, and a plurality of parallel rods, all arranged to operate substantially as and for the purpose set forth.

6. In the manufacture of laminated belts composed of separate plies, the combination of a sewing-machine, feeding-rollers, guides, tension-nippers, and a plurality of parallel rods, substantially as set forth.

7. In the manufacture of laminated belts composed of separate plies, the method, substantially herein described, of adjusting the relative position of said plies, which consists of separating the several plies from each other and of feeding the plies so separated between guides.

MAURICE GANDY.

Witnesses:
J. EDGAR BULL,
ROBERT BARTLETT.